Figure 1:
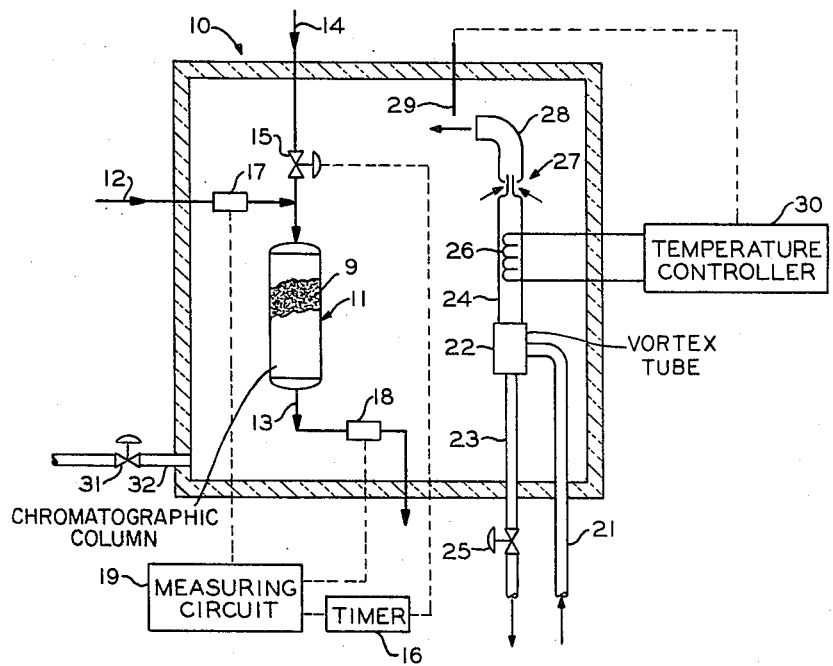

INVENTOR.
M. E. REINECKE

INVENTOR.
M. E. REINECKE

Nov. 15, 1966  M. E. REINECKE  3,285,055
TEMPERATURE CONTROL SYSTEM
Original Filed April 18, 1962  3 Sheets-Sheet 3

INVENTOR.
M. E. REINECKE
BY
*Young & Quigg*
ATTORNEYS

United States Patent Office 3,285,055
Patented Nov. 15, 1966

3,285,055
TEMPERATURE CONTROL SYSTEM
Marvin E. Reinecke, Bartlesville, Okla., assignor to Phillips Petroleum Company, a corporation of Delaware
Original application Apr. 18, 1962, Ser. No. 188,462, now Patent No. 3,224,499, dated Dec. 21, 1965. Divided and this application May 19, 1965, Ser. No. 469,360
9 Claims. (Cl. 73—23.1)

This application is a division of my copending application Serial No. 188,462, filed April 18, 1962, now U.S. Patent 3,224,499.

This invention relates to method and apparatus for controlling the temperature of a system. In one aspect the invention relates to controlling a temperature bath. In another aspect the invention relates to a chromatographic analysis system adapted to operate at reduced temperatures. In yet another aspect the invention relates to method and apparatus for regulating the temperature in an instrument housing. In a still further aspect the invention relates to method and apparatus for controlling the temperature in a system within the range of ambient temperature.

A standard practice for controlling the operating temperature of laboratory and automatic on-stream instruments is to thermostat the instrument at a sufficiently high temperature, such as 150° F., so that some supplementary heat must be added by the control system at the highest ambient temperature. Additional amounts of supplemental heat must be added by the control system at lower ambient temperatures.

However, many instruments, such as the chromatographic analyzer, operate at significantly increased efficiency at lower temperatures, such as in the range of —40° F. to 140° F. Complications arise, however, when the desired operating temperature of the instrument is within the normal range of ambient temperature. One of these complications is that part of the time there is a need for supplemental heat to be added to the system and part of the time there is a need for heat to be removed from the system.

In accordance with the present invention it has now been discovered that the disadvantages of the prior art can be eliminated and the instruments can be operated at greater efficiency within the normal range of ambient temperatures through the utilization of a cooling means in combination with the thermostated heating system. In a preferred embodiment of the invention, a Hilsch vortex tube is utilized as the cooling means.

Accordingly, it is an object of the invention to provide an improved temperature control system. Another object of the invention is to increase the efficiency of operation of various instruments. Yet another object of the invention is to provide for an improved chromatographic analysis system. A still further object of the invention is to provide a control system for regulating temperature within the normal range of ambient temperatures. Another object of the invention is to provide improved method and apparatus for regulating temperature within an instrument housing.

Other aspects, objects and advantages of the invention will be apparent from a study of the disclosure, the drawings and the appended claims to the invention.

Figure 2:
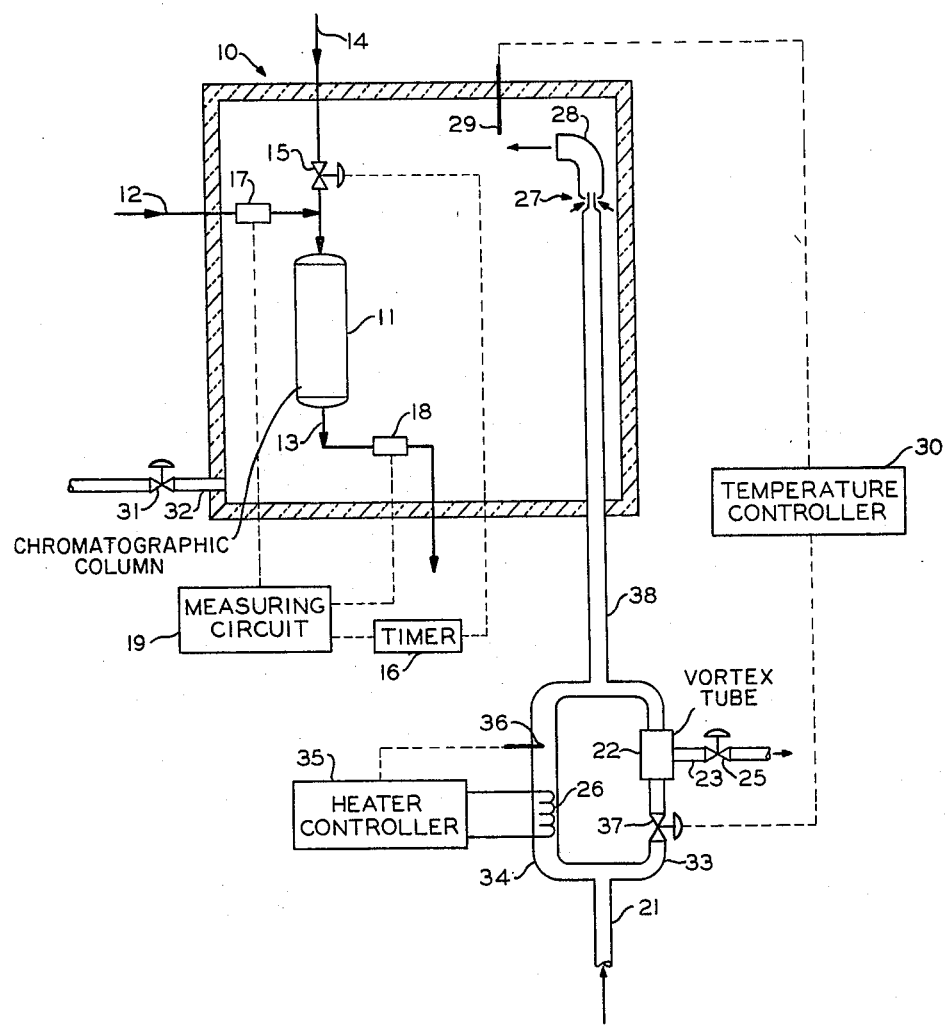
Figure 3:
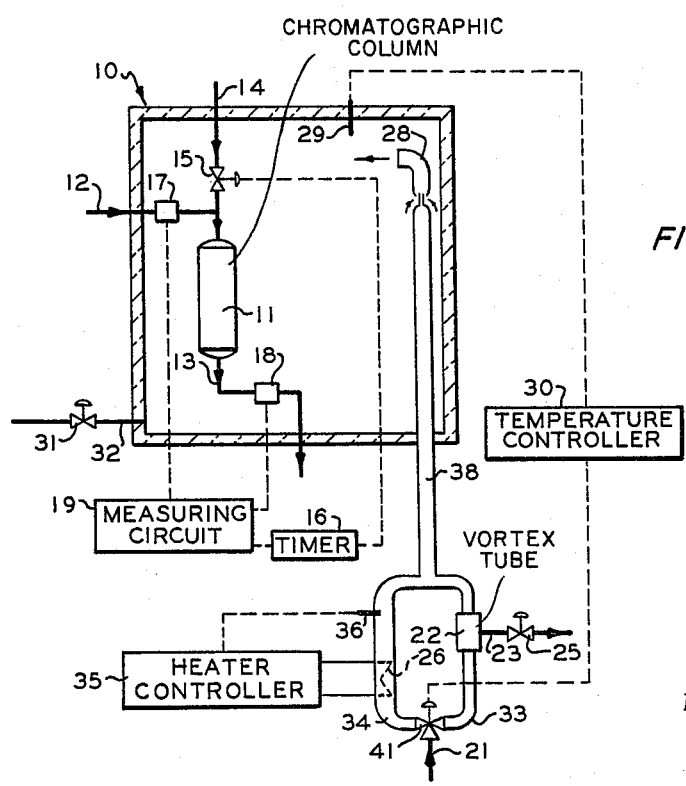

In the drawings, FIGURES 1, 2, and 3 are schematic representations of first, second, and third embodiments of the invention.

Referring now to the drawings and to FIGURE 1 in particular, there is shown a housing 10 made of thermally insulating material. In housing 10 there is shown a conventional chromatographic column 11 which is filled with a packing material 9 that selectively retards passage therethrough of constituents of a fluid mixture to be analyzed.

A carrier gas is introduced into the first end of column 11 through a conduit 12. A conduit 13 removes the effluent from column 11. A sample conduit 14, having a control valve 15 therein, communicates with the first end of column 11. Valve 15 is opened periodically for a preselected time interval by means of a timer 16 so as to introduce a predetermined volume of fluid sample to be measured into column 11. Although shown schematically, valve 15 can be any type of sample valve known in the art which permits the introduction of a predetermined volume of fluid sample.

First and second sensing elements 17 and 18 are disposed in respective conduits 12 and 13. These elements are adapted to compare a property of the fluid flowing through the two conduits to provide an indication of differences therebetween. These detecting elements are advantageously temperature sensitive resistance elements. The detecting elements are connected into a measuring circuit 19 which can be any suitable measuring circuit known in the art. Before the sample fluid is introduced into column 11, carrier gas flows through conduits 12 and 13 so that elements 17 and 18 respond to the same fluid and have identical outputs. Valve 15 is then opened to introduce a sample into column 11. The carrier gas elutes the constituents of the sample from the column in sequence so that element 18 responds sequentially to these individual constituents.

All of the components within housing 10 are maintained at substantially the same temperature by passing a suitable gas, such as air, through conduit 21 and into the input of a Hilsch vortex tube 22. The operation of a Hilsch vortex tube is based on the Ranque-Hilsch effect. The gas passing through the inlet opening enters a tangential entry nozzle producing a vortex in the internal chamber. Energy distribution at this point is such that the heated fraction of the gas passes through the hot exit of vortex tube 22 and conduit 23, while the cooled fraction of the gas, selected from the center mass of the vortex by a restricting orifice, emerges through conduit 24. A valve 25 can be utilized in conduit 23 to control the ratio of hot gas to cold gas produced. A more complete description of the vortex tube is set forth in U.S. Patent 1,952,281, issued March 27, 1934, and which is incorporated herein by reference. The drop in temperature below that of the inlet gas increases as the pressure drop between the inlet and cold outlet increases. For a given inlet pressure and outlet pressure, the temperature drop will be substantially constant regardless of variations in the inlet gas temperature. The cold gas from vortex tube 22 passes through conduit 24 and in heat exchanging relationship with heating element 26 to bring the temperature of the gas up to the desired value. The heated gas in conduit 24 then passes through a Venturi section 27 to cause intimate mixing of the heated gas with the gas already in housing 10. The mixed gas passes through conduit 28 and into housing 10. A temperature sensing means 29, such as a thermocouple, transmits a signal to temperature controller 30 representative of the temperature inside housing 10. Temperature controller 30 regulates the heat output of heating element 26 responsive to the output signal of temperature sensing means 29. The gas entering conduit 21 can be from any suitable source such as plant process air at ambient temperature. Valve 31 in conduit 32 can be utilized to remove excess gas from housing 10. Thus if it is desired to maintain the temperature in housing 10 at 70° F. while ambient temperature varies from 40° F. to 110° F., vortex tube 22 can be adjusted to provide a temperature drop between the inlet and cold outlet of 50° F., thus making the maximum temperature of the gas leaving the cold exit on the order of 60° F. The differential between the 60° F. maximum and the 70° F. desired value can be provided to permit constant control by temperature controller 30 of heating element 26 as this is generally a finer degree of control than the control of vortex tube 22. The heat output of heating element 26 is regulated by temperature controller 30 to bring the temperature of the gas up to 70° F.

Referring now to FIGURE 2, there is shown a modification of FIGURE 1 wherein gas supply conduit 21 has two branch conduits 33 and 34. Heating element 26 is located in branch conduit 34 and is controlled by heater controller 35 responsive to the temperature of the gas just downstream of heating element 26 as determined by temperature sensing element 36. A valve 37 is located in branch conduit 33 between conduit 21 and the inlet of vortex tube 22. The hot exit of vortex tube 22 is connected to conduit 23 which can have a valve 25 mounted therein. The cold exit of vortex tube 22 and the downstream end of branch conduit 34 are connected to the inlet of conduit 38. A first portion of the gas from conduit 21 is passed through branch conduit 34 and in heat exchanging relationship with heating element 26. A second portion of the gas from conduit 21 is passed through conduit 33 into the inlet of vortex tube 22. The cooled gas from the cold exit of vortex tube 22 is mixed with the heated gas in conduit 34 and passed through conduit 38, Venturi section 27 and conduit 28 into housing 10. The temperature in housing 10 is regulated by temperature controller 30 manipulating valve 37 responsive to the output signal of temperature sensing means 29, thus controlling the amount of gas cooled in vortex tube 22 and the temperature drop between the inlet and cold exit of vortex tube 22. Temperature controller 30 can be any suitable device such as Foxboro pneumatic controller Model T/69 described in Bulletin 21–10A of May 1959.

Referring now to FIGURE 3 there is shown a modification of FIGURE 2 wherein conduits 21, 33 and 34 are connected to the inlet and two outlets, respectively, of three way valve 41, which can be an on-off or proportional valve, or other suitable valve. Valve 41 is actuated by temperature controller 30 responsive to the temperature in housing 10, as indicated by temperature sensing element 29. When valve 41 is a proportional valve, the fluid flows through conduits 33 and 34 are manipulated to produce the desired temperature of the combined fluid in conduit 38. When valve 41 is an on-off valve, valve 41 is actuated to select a flow path from conduit 21 to conduit 38 through either conduit 33 or conduit 34, depending upon the sign of the difference between the temperature in housing 10 and the desired temperature, and for a length of time depending upon the heat required to be added or removed from housing 10.

While the presently preferred cooling means is the vortex tube, other suitable cooling means, such as indirect heat exchange with a refrigerant, can be utilized. While the heat exchanging fluid presently preferred for utilization with the vortex tube is gas, any suitable fluid can be utilized with other cooling means. While the invention has been illustrated in combination with a chromatographic analysis system, it is within the contemplation of the invention to control the temperature in any instrument housing, any temperature bath, or the temperature of any object.

Reasonable variations and modifications are possible within the scope of the foregoing disclosure, the drawings and the appended claims to the invention.

I claim:

1. A temperature control system for maintaining the temperature of an object at a substantially constant value within the normal range of ambient temperature which comprises in combination an object, a source of fluid at ambient temperature; a vortex tube having an inlet, a hot fluid outlet and a cold fluid outlet; means for passing fluid from said source of fluid into said inlet of said vortex tube; conduit means connected to said cold fluid outlet; indirect heating means positioned in heat exchanging relationship with said conduit means to heat the cold fluid passing into said conduit means from said cold fluid outlet; means in fluid communication with said conduit means for passing the thus heated cold fluid into heat exchanging relationship with said object; and means for controlling said heating means to regulate the amount of heat transferred to said cold fluid from said heating means responsive to the temperature of said object.

2. A temperature control system for maintaining the temperature of a chromatographic analyzer at a substantially constant value within the normally range of ambient temperature which comprises in combination a chromatographic analyzer, a source of fluid at ambient temperature; a vortex tube having an inlet, a hot fluid outlet and a cold fluid outlet; means for passing fluid from said source of fluid into said inlet of said vortex tube; conduit means connected to said cold fluid outlet; indirect heating means positioned in heat exchanging relationship with said conduit means to heat the cold fluid passing into said conduit means from said cold fluid outlet; means in fluid communication with said conduit means for passing the thus heated cold fluid into heat exchanging relationship with said chromatographic analyzer; and means for controlling said heating means to regulate the amount of heat transferred to said cold fluid from said heating means responsive to the temperature of said chromatographic analyzer.

3. A temperature control system for maintaining the temperature of an object at a substantially constant value within the normal range of ambient temperature which comprises in combination an object, a source of fluid at ambient temperature; a vortex tube having an inlet, a hot fluid outlet and a cold fluid outlet; means for passing a first portion of the fluid from said source into said inlet of said vortex tube; heating means; means for passing a second portion of the fluid from said source into heat exchanging relationship with said heating means; means for combining the thus heated second portion and the fluid from said cold fluid outlet of said vortex tube; means for passing the thus combined fluid into heat exchanging relationship with said object; means for controlling said heating means to maintain the temperature of said thus heated second portion substantially constant; and means for controlling the amount of said first portion responsive to the temperature of said object.

4. A temperature control system for maintaining the temperature of a chromatographic analyzer at a substantially constant value within the normal range of ambient temperature which comprises in combination a chromatographic analyzer, a source of fluid at ambient temperature; a vortex tube having an inlet, a hot fluid outlet and a cold fluid outlet; means for passing a first portion of the fluid from said source into said inlet of said vortex tube; heating means; means for passing a second portion of the fluid from said source into heat exchanging relationship with said heating means; means for combining the thus heated second portion and the fluid from said cold fluid outlet of said vortex tube; means for passing the thus combined fluid into heat exchanging relationship with said chromatographic analyzer; means for controlling said heating means to maintain the temperature of said thus heated second portion substantially constant; and means for controlling the amount of said first portion responsive to the temperature of said chromatographic analyzer.

5. A temperature control system for maintaining the temperature of an object at a substantially constant value within the normal range of ambient temperature which comprises in combination an object, a source of fluid at ambient temperature; a vortex tube having an inlet, a hot fluid outlet and a cold fluid outlet; means for passing a first portion of the fluid from said source into said inlet of said vortex tube; heating means; means for passing a second portion of the fluid from said source into heat exchanging relationship with said heating means; means for combining the thus heated second portion and the fluid from said cold fluid outlet of said vortex tube; means for passing the thus combined fluid into heat exchanging relationship with said object; means for controlling said heating means to maintain the temperature of said thus heated fluid substantially constant; and means for controlling the ratio of the amount of said first portion to the amount of said second portion responsive to the temperature of said object.

6. A temperature control system for maintaining the temperature of a chromatographic analyzer at a substantially constant valeu within the normal range of ambient temperature which comprises in combination a chromotographic analyzer, a source of fluid at ambient temperature; a vortex tube having an inlet, a hot fluid outlet and a cold fluid outlet; means for pasing a first portion of the fluid from said source into said inlet of said vortex tube; heating means; means for passing a second portion of the fluid from said source into heat exchanging relationship with said heating means; means for combining the thus heated second portion and the fluid from said cold fluid outlet of said vortex tube; means for passing the thus combined fluid into heat exchanging relationship with said chromatographic analyzer; means for controlling said heating means to maintain the temperature of said thus heated fluid substantially constant; and means for controlling the ratio of the amount of said first portion to the amount of said second portion responsive to the temperature of said chromatographic analyzer.

7. A temperature control system for maintaining the temperature of a chromatographic analyzer at a substantially constant value within the normal range of ambient temperature comprising a housing; a chromatographic column positioned within said housing, said column being filled with a packing material that selectively retards passage therethrough of constituents of the fluid mixture to be analyzed; first conduit means passing through said housing and communicating between a source of carrier gas and the inlet of said column; a first sensing element disposed within said housing and in said first conduit means to detect a property of the carrier gas flowing through said first conduit means; second conduit means passing through said housing and communicating with said first sensing means downstream of said first sensing element for introducing a sample of the fluid mixture to be analyzed into said first conduit means; third conduit means passing through said housing and communicating with the outlet of said column; a second sensing element disposed within said housing and in said third conduit means to detect a property of the fluid flowing through said third conduit means; means for comparing the outputs of said first and second sensing elements; a source of air at ambient temperature; a vortex tube having an inlet, a hot fluid outlet and a cold fluid outlet; means for passing air from said source of air into said inlet of said vortex tube; fourth conduit means connected between said cold fluid outlet and the interior of said housing; heating means positioned in heat exchanging relationship with the contents of said fourth conduit means to heat the cold fluid passing into said fourth conduit means from said cold fluid outlet; means for venting air from said housing; and means responsive to the temperature to the air in said housing for controlling said heating means to regulate the amount of heat transferred to said cold fluid.

8. A temperature control system for maintaining the temperature of a chromatographic analyzer at a substantially constant value within the normal range of ambient temperature comprising a housing; a chromatographic column positioned within said housing, said column being filled with a packing material that selectively retards passage therethrough of constituents of the fluid mixture to be analyzed; first conduit means passing through said housing and communicating between a source of carrier gas and the inlet of said column; a first sensing element disposed within said housing and in said first conduit means to detect a property of the carrier gas flowing through said first conduit means; second conduit means passing through said housing and communicating with said first conduit means downstream of said first sensing element for introducing a sample of the fluid mixture to be analyzed into said first conduit means; third conduit means passing through said housing and communicating with the outlet of said column; a second sensing element disposed within said housing and in said third conduit means to detect a property of the fluid flowing through said third conduit means; means for comparing the outputs of said first and second sensing elements; a source of air at ambient temperature; a vortex tube having an inlet, a hot fluid outlet and a cold fluid outlet; means for passing a first portion of the air from said source of air into said inlet of said vortex tube; heating means; means for passing a second portion of the air from said source of air into heat exchanging relationship with said heating means; means for combining the thus heated second portion and the cold air from said cold fluid outlet of said vortex tube and passing the thus combined fluid into said housing and in heat exchanging relationship with said chromatographic column; means for sensing the temperature of said thus heated second portion and for producing a first signal responsive thereto; means responsive to said first signal for controlling said heating means to maintain the temperature of said heated second portion substantially constant; means for determining the temperature of the air in said housing and establishing a second signal responsive thereto; and means responsive to said second signal for controlling the amount of air passed from said source of air into said inlet of said vortex tube.

9. A temperature control system for maintaining the temperature of a chromatographic analyzer at a substantially constant value within the normal range of ambient temperature comprising a housing; a chromatographic column positioned within said housing, said column being filled with a packing material that selectively retards passage therethrough of constituents of the fluid mixture to be analyzed; first conduit means passing through said housing and communicating between a source of carrier gas and the inlet of said column; a first sensing element disposed within said housing and in said first conduit means to detect a property of the carrier gas flowing through said first conduit means; second conduit means passing through said housing and communicating with said first conduit means downstream of said first sensing element for introducing a sample of the fluid mixture to be analyzed into said first conduit means; third conduit means passing through said housing and communicating with the outlet of said column; a second sensing element disposed within said housing and in said third conduit means to detect a property of the fluid flowing through said third conduit means; means for comparing the outputs of said first and second sensing elements; a source of air at ambient temperature; a vortex tube having an inlet, a hot fluid outlet and a cold fluid outlet; a three-way valve having an inlet and first and second outlets; means for passing air from said source of air into said inlet of said valve; conduit means for passing air from said first outlet of said valve into said inlet of said vortex tube; heating means; means for passing air from said second outlet of said valve into heat exchanging relationship with said heating means to heat the air; means for combining the thus heated air and the cold air from said cold fluid outlet of said vortex tube and for passing the thus combined fluid into said housing and in heat exchanging relationship with said column; means for determining the temperature of said thus heated air and establishing a first signal responsive thereto; means responsive to said first signal for controlling said heating means to maintain the temperature of said heated air substantially constant; means for determining the temperature of the air in said housing and establishing a second signal representative thereof; means responsive to said second signal for controlling said valve to regulate the ratio of the amount of air passed to the inlet of said vortex tube to the amount of air passed in heat exchanging relationship with said heating means; and means for venting air from said housing.

References Cited by the Examiner

UNITED STATES PATENTS

| | | | |
|---|---|---|---|
| 1,827,099 | 10/1931 | Otis | 165—65 |
| 2,510,952 | 6/1950 | Brewster | 165—63 |
| 2,644,315 | 7/1953 | Jamieson | 62—5 |
| 2,671,643 | 3/1954 | Gordon | 165—27 |
| 2,737,028 | 3/1956 | Machlanski | 62—5 |
| 2,819,590 | 1/1958 | Green | 62—5 |
| 3,026,681 | 3/1962 | Green | 62—5 |
| 3,062,037 | 11/1962 | Donner et al. | 73—23.1 |
| 3,122,014 | 2/1964 | Dobbins | 73—23.1 |

RICHARD C. QUEISSER, *Primary Examiner.*

J. FISHER, *Assistant Examiner.*